Patented Sept. 8, 1936

2,053,769

UNITED STATES PATENT OFFICE 2,053,769

REMOVAL OF VOLATILE COMPOUNDS FROM A FERMENTING MEDIUM

Henry Dreyfus, London, England

No Drawing. Application July 18, 1934, Serial No. 735,785. In Great Britain August 15, 1933

9 Claims. (Cl. 202—42)

This invention relates to the production of volatile organic compounds by fermentation processes.

According to the present invention organic compounds produced by fermentation are removed as such from the liquor or mash containing the substrate, i. e. the substance being decomposed in the fermentation, during the process of the fermentation. By this means the ratio product: substrate may be maintained at a low level with the result that the yield of fermentation product per unit of time is considerably increased. In some cases the actual yield may be increased in this manner, for instance when the action of the enzyme or bacillus producing the fermentation is deleteriously affected by high concentration of the product.

More specifically the fermentation product may be removed in the vapour state by vaporization from the fermenting liquor or mash.

The vaporization of the fermentation product is preferably effected at or near the fermentation temperature and to carry out the vaporization most efficiently under these conditions reduced pressure, for example 5–10 mm. or less, should be employed.

The vaporization can be further assisted by passage of a gas or gas mixture over or through the fermenting materials. In the case of anaerobic fermentations, e. g. alcoholic fermentation, such a gas must be oxygen-free and carbon dioxide, nitrogen and mixtures of these gases are very suitable. When carrying out aerobic fermentations air is the most convenient gas to employ though other oxygen-containing gas mixtures or oxygen itself may be used if desired.

The preferred method of effecting the vaporization of the fermentation product, or of a particular constituent or particular constituents of the fermentation product, comprises the addition of suitable liquids which form azeotropic mixtures therewith, for instance, in the alcoholic fermentation n-hexane may be added to assist vaporization of the ethyl alcohol produced. For greatest efficiency this method may be combined with the employment of low pressures and/or passage of gases over or through the fermentation liquor. Such azeotropic mixtures may be simple binary mixtures of added liquid with the body to be removed, or tertiary mixtures comprising for instance water, or even more complex mixtures. This method of assisting the evaporation of the fermentation product is particularly advantageous when applied to processes in which more than one body is produced by the fermentation, since it enables the proportions of the different bodies vaporized to be varied. Thus, in the butyl-acetonic fermentation the addition of cyclo-hexane enables the proportion of butyl alcohol in the butyl alcohol-acetone mixture vaporized to be considerably increased. The addition of the azeotrope-forming liquids may, for instance, be made by continuous or intermittent supply in liquid form to the fermenting material, or alternatively, or in addition, where a stream of gas is passed therethrough as above described, the gas may be caused to carry vapour of the azeotrope into the fermenting materials.

Water lost from the fermenting materials by vaporization together with the fermentation product may be replaced continuously or intermittently in order to maintain the substrate in a suitable concentration.

With the rapid fermentation which removal of the fermentation product permits the substrate concentration is rapidly lowered, but this can be counteracted by replenishing the starting material used. A preferred form of the invention therefore comprises maintaining the substrate in high concentration by continuous or intermittent addition to the fermentation zone coupled with maintenance of low concentration of the fermentation product by continuous or intermittent removal thereof in vapour form; it will be appreciated that a continuous process is thus obtained. It should be noted, however, that the invention is not limited to continuous removal of fermentation product and that the removal may, if desired, be effected at intervals. Such a method of operation is particularly suitable when large quantities of gas are produced in the fermentation (e. g. in the alcoholic fermentation) and enables a single vacuum distillation plant to be employed in conjunction with a number of fermentation vats.

Continuous or intermittent additions may be made to the fermentation liquor to keep a sufficiently high concentration of active fermenting complex. Such additions can be of the fermenting complex itself, whether of a particular yeast, yeast extract or bacterium, or they may consist of additions of particular constituents. Thus, when fermenting with the aid of a top yeast additions may be made of the particular enzyme taking part in the desired change, whilst if a bottom yeast is employed it is most advantageous in order to maintain an active fermentation to add co-enzyme. Such additions can very conveniently be made together with the fresh supplies of starting material.

In carrying out the process of the invention it is particularly advantageous that additions made during the fermentation process, e. g. of water, fresh starting material or other substances, should be in such quantity as to maintain the various substances present (including the ferment) in substantially uniform concentration. In this connection it is to be noted that in, for example, the alcoholic fermentation of sugar an increase in volume of the fermentation liquor results in further growth of the yeast which involves consumption of sugar without formation of alcohol.

The output of fermentation processes per unit of time may be still further increased by other methods. Thus, in the alcoholic fermentation soluble phosphates may be added, preferably together with a small amount of a body such as sodium arsenate which prolongs the otherwise relatively short time of increased activity due to the addition of the phosphates.

Whilst the invention includes broadly the removal of the fermentation product as such, i. e. in the form in which it is produced, it should be remarked that, as pointed out above with regard to the employment of substances forming azeotropic mixtures to assist vaporization, it is not necessary where more than one product is produced by the fermentation, that these products should be removed in the same proportion as those in which they are produced.

It is to be understood that the invention is not limited to specific fermentation processes, but can be applied generally to processes in which organic compounds are produced, which are more easily volatile, or can be made more easily volatile, e. g. azeotropically, than the starting material employed which may be of the most diverse nature, e. g. sugars, cellulose, starch as such or in the form of cereal grains, potatoes, molasses, beets, the products of cellulose hydrolysis and the like.

The following example illustrates the invention, as applied to the alcoholic fermentation of sugar, but it is to be understood that this example is given solely by way of illustration and is in no way limitative.

*Example*

An aqueous solution of fermentable sugar, such as may be obtained by the saccharification of cellulose, contained in a closed vessel is sterilized, after which a suitable yeast culture, together with suitable nutrients, is introduced and allowed to grow.

After growth of the yeast is finished and alcohol production commences, the pressure in the fermentation vessel is reduced until the fermenting liquor boils gently at the temperature employed, which should be maintained at about 25° C., normal hexane being fed into the fermentation vessel at the same time.

Normal hexane recovered from the vapours leaving the fermentation vessel is returned to the process while the alcohol may be stored or rectified immediately as desired.

During the fermentation a sugar solution is introduced of such a concentration that the sugar concentration in the fermentation liquor is maintained constant without any substantial change in the volume of the fermentation liquor. The solution thus introduced may also contain quantities of such other additions as it is desired to make in order to maintain an active fermentation.

What I claim and desire to secure by Letters Patent is:—

1. In the manufacture of a volatile organic compound by fermentation of a carbohydrate material introducing an agent inert towards the fermentation and additional to the substances normally present in the fermenting material, and removing said volatile organic compound, in the form of a vaporous azeotropic mixture with said agent, from the fermenting material during the fermentation thereof.

2. In the manufacture of a volatile organic compound by fermentation of a carbohydrate material introducing an agent inert towards the fermentation and additional to the substances normally present in the fermenting material, removing said volatile organic compound, in the form of a vaporous azeotropic mixture with said agent, from the fermenting material during the fermentation thereof, and maintaining the concentrations of the various substances in the fermentation zone substantially uniform throughout the process.

3. In the manufacture of a volatile organic compound by fermentation of a carbohydrate material introducing an agent inert towards the fermentation and additional to the substances normally present in the fermenting material, removing said volatile organic compound continuously, in the form of a vaporous azeotropic mixture with said agent, from the fermenting material during the fermentation thereof, and maintaining the concentrations of the various substances in the fermentation zone substantially uniform throughout the process.

4. In the manufacture of ethyl alcohol by fermentation of a carbohydrate material introducing an agent inert towards the fermentation and additional to the substances normally present in the fermenting material, and removing the ethyl alcohol in the form of a vaporous azeotropic mixture with said agent from the fermenting material during the fermentation thereof.

5. In the manufacture of ethyl alcohol by fermentation of a carbohydrate material introducing an agent inert towards the fermentation and additional to the substances normally present in the fermenting material, removing the ethyl alcohol in the form of a vaporous azeotropic mixture with said agent from the fermenting material during the fermentation thereof, and maintaining the concentrations of the various substances in the fermentation zone substantially uniform throughout the process.

6. In the manufacture of ethyl alcohol by fermentation of a carbohydrate material introducing an agent inert towards the fermentation and additional to the substances normally present in the fermenting material, removing the ethyl alcohol continuously in the form of a vaporous azeotropic mixture with said agent from the fermenting material during the fermentation thereof, and maintaining the concentrations of the various substances in the fermentation zone substantially uniform throughout the process.

7. In a process for the manufacture of ethyl alcohol by fermentation of a carbohydrate material, removing ethyl alcohol, in the form of a vaporous azeotropic mixture with normal hexane, from the fermenting material during the fermentation thereof.

8. In a process for the manufacture of ethyl alcohol by fermentation of a carbohydrate material, removing ethyl alcohol, in the form of a vaporous azeotropic mixture with normal hexane, from the fermenting material during the fermentation thereof, and maintaining the concentrations of the various substances in the fermentation zone substantially uniform throughout the process.

9. In a process for the manufacture of ethyl alcohol by fermentation of a carbohydrate material, as a continuous operation, removing ethyl alcohol, in the form of a vaporous azeotropic mixture with normal hexane, from the fermenting material during the fermentation thereof, and maintaining the concentrations of the various substances in the fermentation zone substantially uniform throughout the process.

HENRY DREYFUS.